United States Patent
Bhargava et al.

(10) Patent No.: US 10,097,562 B2
(45) Date of Patent: Oct. 9, 2018

(54) SERVICE TOKEN HANDLING

(71) Applicant: SAP SE, Walldorf (DE)

(72) Inventors: Apoorv Bhargava, Bangalore (IN);
Aswin Kumar Jayaraman, Chennai (IN); Raghavendra Rao M G, Walldorf (DE); Naveed Mohammed, Bangalore (IN); Markus Schmidt-Karaca, Heidelberg (DE)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 15/148,165

(22) Filed: May 6, 2016

(65) Prior Publication Data

US 2017/0324749 A1    Nov. 9, 2017

(51) Int. Cl.
*H04L 29/06*    (2006.01)
*H04L 29/08*    (2006.01)

(52) U.S. Cl.
CPC .......... *H04L 63/108* (2013.01); *H04L 63/062* (2013.01); *H04L 63/068* (2013.01); *H04L 63/123* (2013.01); *H04L 67/02* (2013.01)

(58) Field of Classification Search
CPC ... H04L 63/108; H04L 63/062; H04L 63/123; H04L 67/02; H04L 9/321; H04L 9/3213
See application file for complete search history.

(56) References Cited

U.S. PATENT DOCUMENTS

| | | | |
|---|---|---|---|
| 9,860,324 B1 * | 1/2018 | Roskind | H04L 67/146 |
| 2011/0271099 A1 * | 11/2011 | Preiss | H04L 63/0807 |
| | | | 713/155 |
| 2017/0111338 A1 * | 4/2017 | Malatesha | H04L 63/08 |

\* cited by examiner

*Primary Examiner* — Hadi S Armouche
*Assistant Examiner* — Alexander R Lapian
(74) *Attorney, Agent, or Firm* — Buckley, Maschoff & Talwalkar LLC

(57) ABSTRACT

A system includes reception, at a server and in a first browser session, of a request from a client for a token to access a first software service, determination of a token stored in a server memory of the server and associated with the first service and the client, determination, at the server, of whether a validity period of the token is within a predetermined period of expiration, and, if it is determined that the validity period of the token is within a predetermined period of expiration, transmission of a request for a new token to access the first software service from a token provider associated with the first service, reception of the new token from the token provider, and provision of the new token to the client in the first browser session.

15 Claims, 7 Drawing Sheets

| User | Service | Secret Key | Token | Expiration |
|---|---|---|---|---|
| U123 | S1 | SK_1231 | | |
| U321 | S1 | SK_3211 | | |
| U123 | S2 | SK_1232 | | |
| U456 | S2 | SK_4562 | | |
| U321 | S3 | SK_3123 | | |

*FIG. 4*

| User | Service | Secret Key | Token | Expiration |
|---|---|---|---|---|
| U123 | S1 | SK_1231 | T1231 | 04/15/16 15:43:21 |
| U321 | S1 | SK_3211 | | |
| U123 | S2 | SK_1232 | | |
| U456 | S2 | SK_4562 | | |
| U321 | S3 | SK_3123 | | |

*FIG. 5*

| User | Service | Secret Key | Token | Expiration |
|---|---|---|---|---|
| U123 | S1 | SK_1231 | T1231 | 04/15/16 15:43:21 |
| U321 | S1 | SK_3211 | | |
| U123 | S2 | SK_1232 | T1232 | 04/15/16 17:03:32 |
| U456 | S2 | SK_4562 | | |
| U321 | S3 | SK_3123 | | |

*FIG. 6*

| User | Service | Secret Key | Token | Expiration |
|------|---------|------------|-------|------------|
| U123 | S1 | SK_1231 | T1231 | 04/15/16 15:43:21 |
| U321 | S1 | SK_3211 | | |
| U123 | S2 | SK_1232 | T1232 | 04/15/16 17:03:32 |
| U456 | S2 | SK_4562 | T4562 | 04/15/16 18:43:20 |
| U321 | S3 | SK_3123 | | |

*FIG. 7*

| User | Service | Secret Key | Token | Expiration |
|------|---------|------------|-------|------------|
| U123 | S1 | SK_1231 | T1231_1 | 04/15/16 19:33:41 |
| U321 | S1 | SK_3211 | | |
| U123 | S2 | SK_1232 | T1232 | 04/15/16 17:03:32 |
| U456 | S2 | SK_4562 | T4562 | 04/15/16 18:43:20 |
| U321 | S3 | SK_3123 | | |

*FIG. 8*

SERVICE TOKEN HANDLING

BACKGROUND

OData (Open Data Protocol) services facilitate access to business functionality for disparate clients such as HTML5 applications or mobile clients. OAuth is the authorization concept for OData services. OAuth provides constrained access to services without requiring the client to pass or store a credential such as a user id/password. Rather, the client application uses an access token to access a constrained set of services from a service provider.

Conventional database applications running on a cloud-based database server may support the OAuth mechanism in two different ways. In one scenario, a browser-based client application uses a secret key to authenticate with a token/service provider, which in turn provides a token required to access a particular service. The client application then uses this token to directly call the token/service provider. This approach is not secure because the secret key and the token are stored in the browser application.

In another scenario, such as that depicted in FIG. 1, a portal server exposes a proxy for the token/service provider to the client/browser application. The browser application sends a resource request to the proxy, which authenticates with the token/service provider using a secret key stored on the server, and then requests the required token therefrom. After receiving the token, the proxy appends the token to the resource request and forwards the request to the token/service provider. The token is also used for subsequent resource requests received from the browser application. As illustrated, the browser application is not able to directly call the service provider or directly receive resources therefrom. This negatively impacts the performance of the application.

BRIEF DESCRIPTION OF THE DRAWINGS

FIG. 4 through 8 are tabular representations of a portion of a database table according to some embodiments.

DETAILED DESCRIPTION

Figure 1:
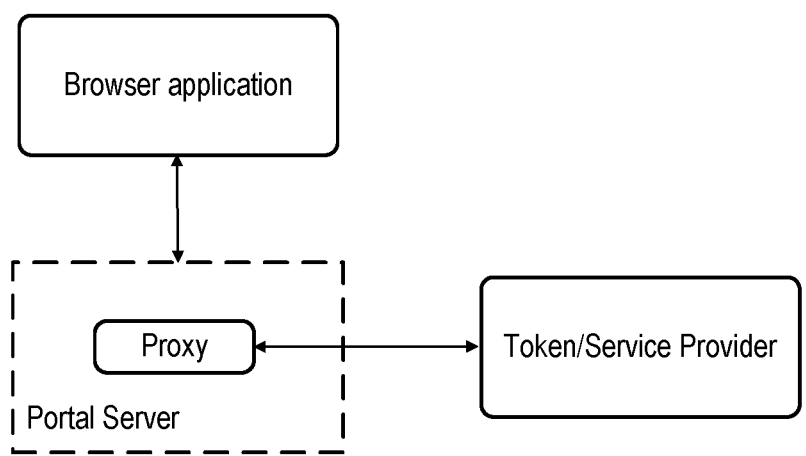
FIG. 1 is a block diagram of a system.
Figure 2:
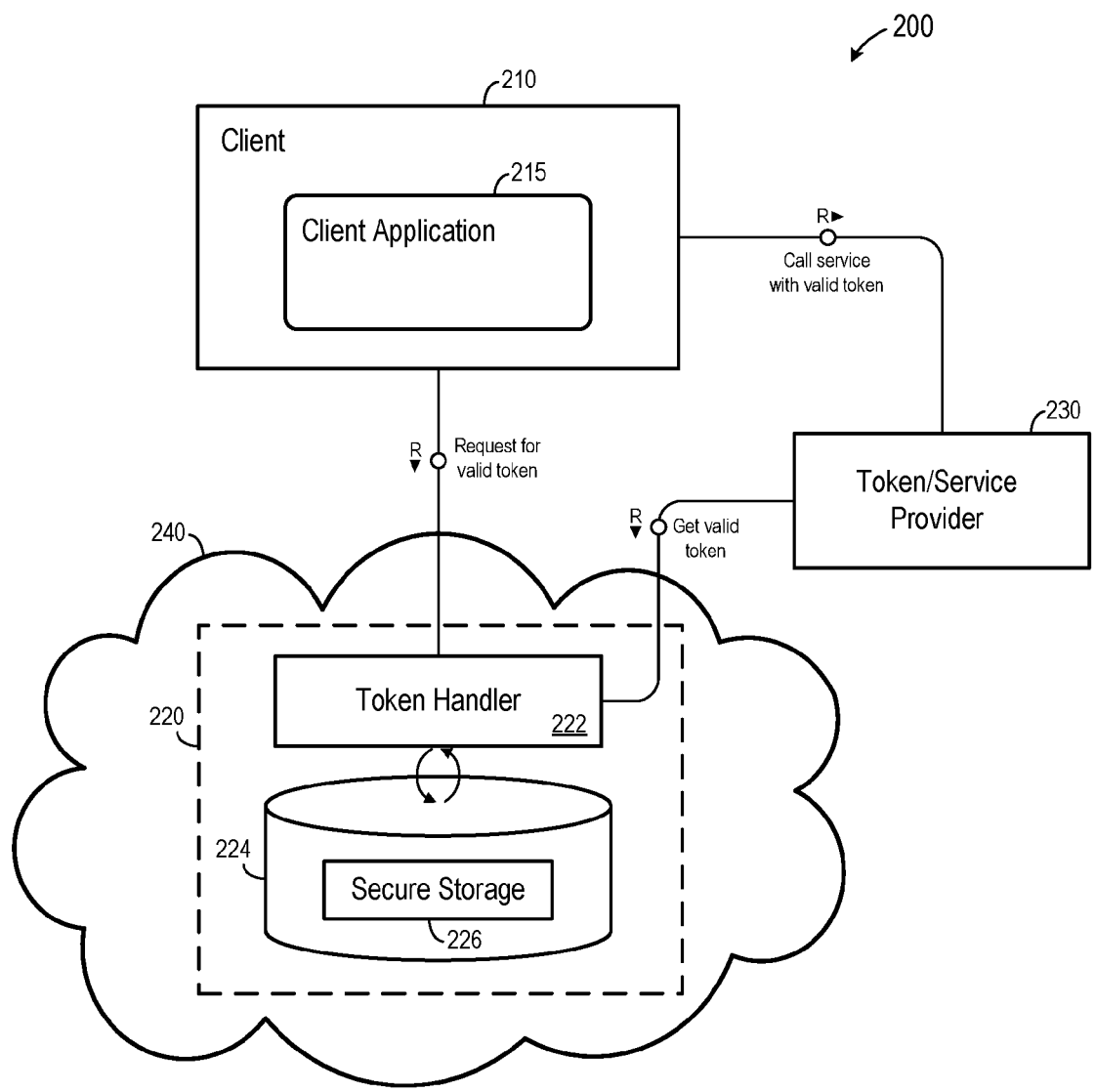
FIG. 2 is a block diagram of a system according to some embodiments.

FIG. 2 is a block diagram of system 200 according to some embodiments. FIG. 2 represents a logical architecture for describing processes according to some embodiments, and actual implementations may include more or different logical elements arranged in other manners. Each logical element may be implemented by computing hardware and/or by program code executed by one or more processors of one or more computing devices, but embodiments are not limited thereto.

System 200 includes client 210, server 220 and token/service provider 230. Server 220 includes token handler 222 and data store 224. Generally, server 220 receives requests from client 210 and provides corresponding services to client 210 based on applications executed by server 220 and data stored in data store 224.

Client application 215 may be configured to communicate with server 220 via any protocol that is or becomes known, including the OData protocol. According to some embodiments, client 210 executes a Web browser, client application 215 is a browser application, and server 220 implements a Web server. Client application 215 may comprise a proprietary dedicated application for communicating with portal server 220.

As will be described in detail below, token handler 222 may receive requests (e.g., OData resource requests) from client application 215 and process those requests to a resource based on information stored in data store 224. Token handler 222 may comprise a server application executing within server 220. Generally, server applications may comprise server-side executable program code (e.g., compiled code, scripts, etc.) which provide functionality to clients by providing user interfaces, receiving requests, retrieving data from data store 224 or elsewhere based on the requests, processing the received data, and providing the processed data to the clients.

Server 220 executes and provides services to server applications. For example, according to some embodiments, server 220 provides a comprehensive set of embedded services which provide end-to-end support for Web-based applications. The services may include a lightweight web server, configurable support for Open Data Protocol, server-side JavaScript execution and access to SQL and SQLScript.

Applications executing on server 220 such as token handler may communicate with data store 224 using database management interfaces such as, but not limited to, Open Database Connectivity (ODBC) and Java Database Connectivity (JDBC) interfaces. Applications may use Structured Query Language (SQL) to manage and query data stored in data store 224.

In this regard, data store 224 may include a database management system to serve requests to retrieve and/or modify data of data store 224, and to perform administrative and management functions. Such functions may include snapshot and backup management, indexing, optimization, garbage collection, and/or any other database functions that are or become known. Data store 224 may also provide application logic, such as database procedures and/or calculations, according to some embodiments. This application logic may comprise scripts, functional libraries and/or compiled program code.

Although illustrated as comprising both token handler 222 and data store 224, server 220 may comprise a dedicated application server which is separate from a database server which manages data store 224. However, in some embodiments, close integration of the application and database services of server 220 may enable execution of server applications completely on the database platform, without the need for an additional application server.

Data store 224 may comprise any query-responsive data source or sources that are or become known, including but not limited to a SQL relational database management system. Data store 224 may comprise a relational database, a multi-dimensional database, an eXtendable Markup Language (XML) document, or any other data storage system storing structured and/or unstructured data. The data of data store 224 may be distributed among several relational databases, dimensional databases, and/or other data sources. Embodiments are not limited to any number or types of data sources.

Data store 224 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

According to some embodiments, data store 224 includes secure storage 226. Secure storage 226 may be protected from unauthorized access to a greater degree than other data (e.g., business data) stored in data store 224, but embodiments are not limited thereto. For example, secure storage 226 may store data using a stronger encryption regime than other data of data store 224, may be stored outside of the filesystem of data store 224, and/or the like. The data of secure storage 226 may be stored as tabular data as described above, or may be stored in a different format. As will be described below, secure storage 226 may store secret keys and tokens required to access services according to some embodiments.

Service provider 220 is depicted as residing in cloud 240. Such a depiction is merely intended to indicate communication between client 210 and server 220 using cloud-based protocols, but embodiments are not limited thereto. Cloud 240 may comprise the internet, in that server 220 is located remote from client 210. Server 220 may be distributed within cloud 240, may be behind a firewall of a company which is connected to the internet, and/or may exhibit any architecture distributed across any number and/or type of networks.

Token/service provider 230 may reside in a same or different network as server 220. Token/service provider 230 may also be cloud-based but embodiments are not limited thereto. In some embodiments, server 220 is managed by a first company providing cloud-based database services and token/service provider 230 is managed by a second company providing other cloud-based business services.

According to some embodiments, token/service provider 230 receives a request for a token from token handler 222, the request including a secret key. Token/service provider 230 determines whether the secret key corresponds to the requested token and, if so, returns the token to server 220. The token is provided to client application 215, which may then use the token to access a resource provided by token/service provider 230.

Figure 3:
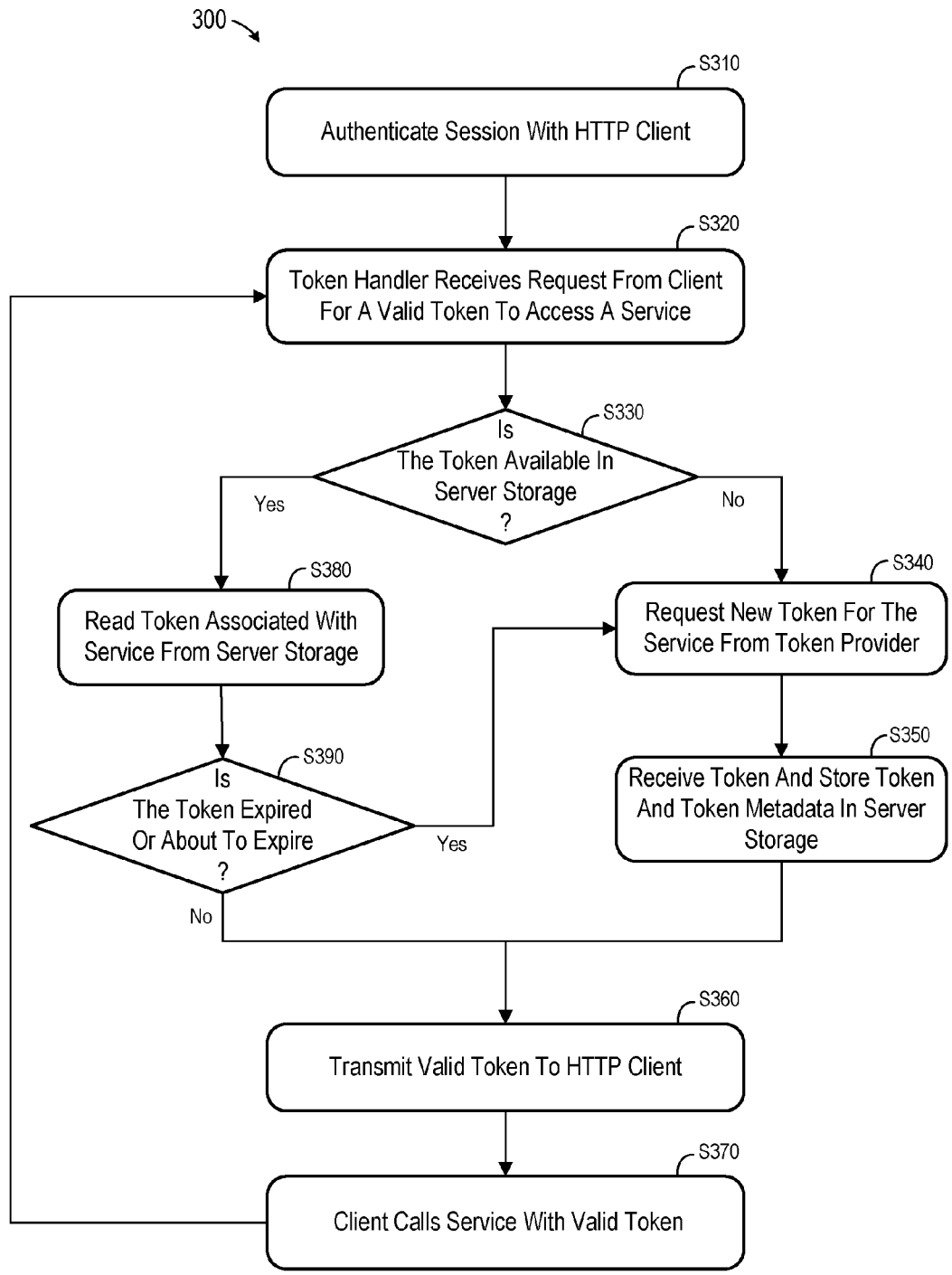
FIG. 3 is a flow diagram of a process according to some embodiments.

In this regard, FIG. 3 comprises flow diagram of process 300 according to some embodiments. In some embodiments, various hardware elements of system 200 execute program code to perform process 300. In some embodiments, hardwired circuitry may be used in place of, or in combination with, program code for implementation of processes according to some embodiments. Embodiments are therefore not limited to any specific combination of hardware and software.

Initially, at S310, a session is authenticated with an HTTP client. With reference to the example of system 200, to which embodiments are not limited, server 220 may receive an authentication request from client application 215 at S310 and may authenticate the session, e.g., using username/password authentication.

Next, at S320, a token handler receives a request from a client for a valid token to access a service. Continuing the current example, client application 215 may send a request for a token to server 220 within the already-authenticated session, which is passed to token handler 222. The request may specify the session user and the service to be accessed.

Next, at S330, it is determined whether a suitable token is stored on the server. FIG. 4 is a tabular representation of a portion of table 228 which may be stored in secure storage 226 according to some embodiments. As shown, each row of table 228 associates a user with a service, a secret key, a token and a token expiration. As also shown, a user may be associated with more than one service and a service may be associated with more than one user. Each secret key, however, is unique to each user/service pair.

Returning to the example, it will initially be assumed that no tokens are currently stored in table 228. Flow therefore proceeds from S330 to S340, at which a new token for the requested service is requested from a token provider. Requesting the token may proceed according to known protocols (e.g., OAuth protocols), and generally consists of forwarding a request and the corresponding secret key (e.g., obtained from table 228) to a token provider associated with the requested service. In this regard, server 220 may also store a network location of the token provider associated with each service, in table 228 or elsewhere.

Token handler 220 may request the token from token/service provider 230 at S340 and receive the token therefrom at S350. Also at S350, token handler 222 stores the token and corresponding metadata in secure storage 226.

FIG. 5 illustrates table 228 after storage of a token and its metadata at S350. The metadata includes an expiration time, the purpose of which will be described below. The expiration time may be provided by the token/service provider from which the token was received, may be set by token handler 222 according to system configuration settings, or may be otherwise generated. Generally, the expiration time may be determined to establish a suitable validity period for the token, after which the token will be unusable to access the associated service. The validity period may differ depending on the user and/or the service associated with the token, in some embodiments.

The token is transmitted to the HTTP client within the authenticated session at S360. Next, at S370, the client calls the service using the token. FIG. 2 illustrates such a call between client 210 and token/service provider 230 according to some embodiments. Some embodiments advantageously avoid the two-layer call to the service provider described in the Background, and/or provide greater security by maintaining the secret key on the server. Moreover, because it is stored within the HTTP session, the token is not persisted on the client and is inaccessible on the client after expiration of the HTTP session.

Flow may return to S320 from S370. The token handler may receive, at S320, another request from the client for a valid token to access a service. It will be assumed that the service (e.g., "S2" of table 228) is different from the previously-mentioned service (e.g., "S1" of table 228). Accordingly, as described above, it is determined at S330 that a corresponding token is not available in server storage and flow continues to S350.

A new token is requested from the token provider at S340 by forwarding a request and the secret key associated with service S2 and user U123 (e.g., obtained from table 228) to a token provider associated with the requested service, which in the present example is again token provider 230 of system 200. According to some embodiments, the token provider which issues tokens to access service S2 is different from the token provider which issues tokens to access service S1. In order to facilitate requesting tokens from appropriate token providers, table 228 may store identifiers and network locations of the token provider associated with each service.

Token handler 222 receives the token at S350 and stores the token and corresponding metadata in secure storage 226. FIG. 6 illustrates table 228 after storage of a token associated with service S2 and its metadata. The metadata includes an expiration time as described above. The token is transmitted to the HTTP client within the authenticated session at S360, and the client calls the service using the token at S370. As illustrated in FIG. 2, the call is issued directly from client 210 to token/service provider 230. Embodiments are not limited to a single service provider. That is, the service provider providing service S1 may differ from the service provider providing service S2.

It will now be assumed that flow returns to S320, at which the token handler receives another request from the client for a valid token to access service S1. Therefore, at S330, because the server stores a token associated with the user (i.e., "U123") and with service S1 as shown in FIG. 6, it is determined that a token is available and flow continues to S380.

The token is read along with its metadata at S380. It is then determined at S390 whether the token is expired or about to expire. The determination at S390 may include determining a difference between the expiration time associated with the token and the current time. For example, it may be determined that the token is about to expire if the current time is within ten minutes of the expiration time.

Depending on the type of metadata stored with the token, the determination at S390 may proceed in several ways. For example, the metadata may specify a time at which the token was originally received and/or originally-generated, in which case the determination may computing the expiration time by adding a predetermined validity period value to the time specified in the metadata.

If it is determined at S390 that the token has not expired and is not about to expire, the token is transmitted to the client at S360 and flow continues as described above. If the determination at S390 is affirmative, a new token is requested at 340 and flow continues therefrom as described above. Accordingly, embodiments reduce a number of required token generations in comparison to other systems. FIG. 7 illustrates such a scenario, in which the token previously associated with user U123 and service S1 has changed, and a new expiration time has been associated therewith.

According to some embodiments, token handler 222 receives requests from multiple clients in parallel and stores any tokens associated with those clients in secure storage 226. For example, FIG. 8 illustrates a scenario in which client U456 has requested a token to access service S2 during the above-described session of user 123. Therefore, in some embodiments, token handler 222 executes several instances of process 300 in parallel for each of several clients.

Figure 9:
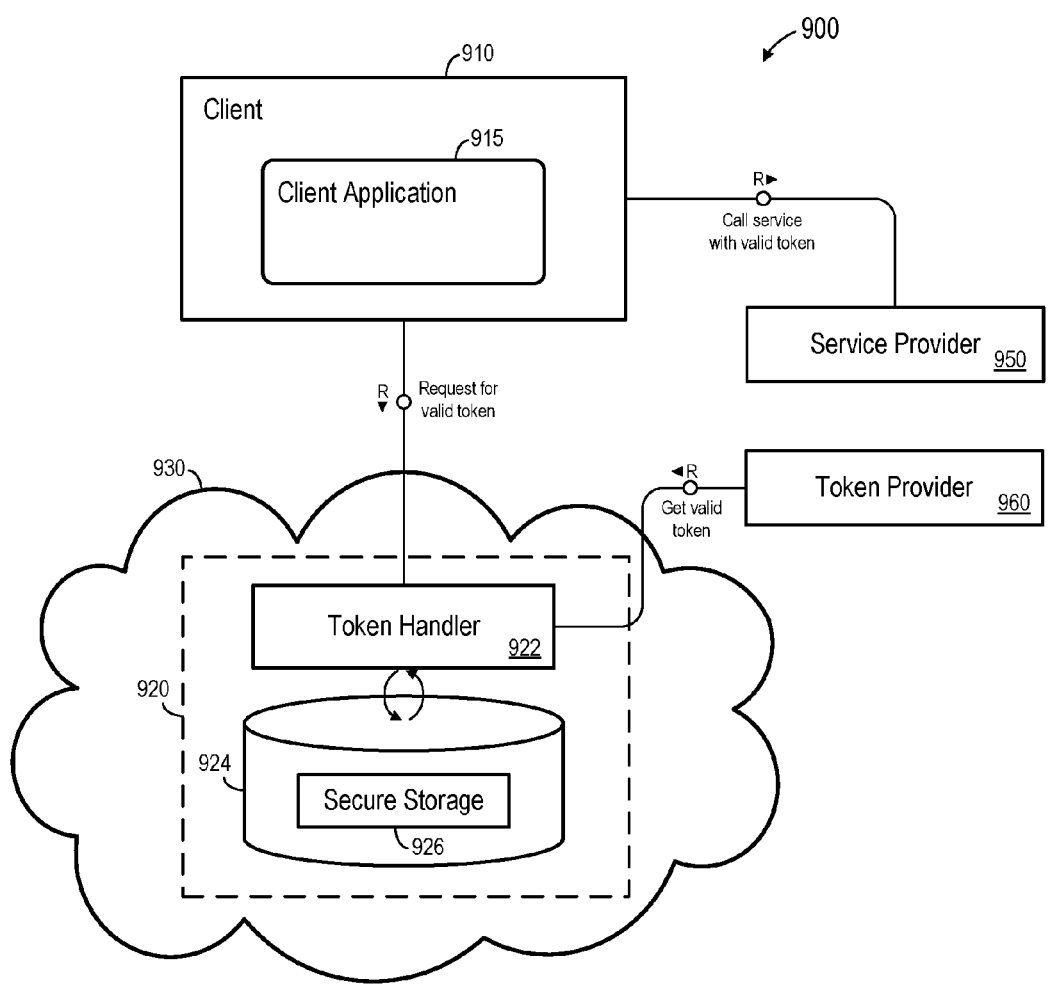
FIG. 9 is a block diagram of a system according to some embodiments.

FIG. 9 is a block diagram of system 900, whose components may be implemented as described above with respect to similarly-numbered components of system 200. System 900 illustrates a multiple-client architecture as mentioned above. Moreover, system 900 depicts separate and multiple token and service providers. A single token provider 960 may provide tokens for accessing one or more services of one or more service providers 950. In some embodiments, two or more token providers 960 may provide tokens for accessing one or more services of a single service provider 950.

Figure 10:
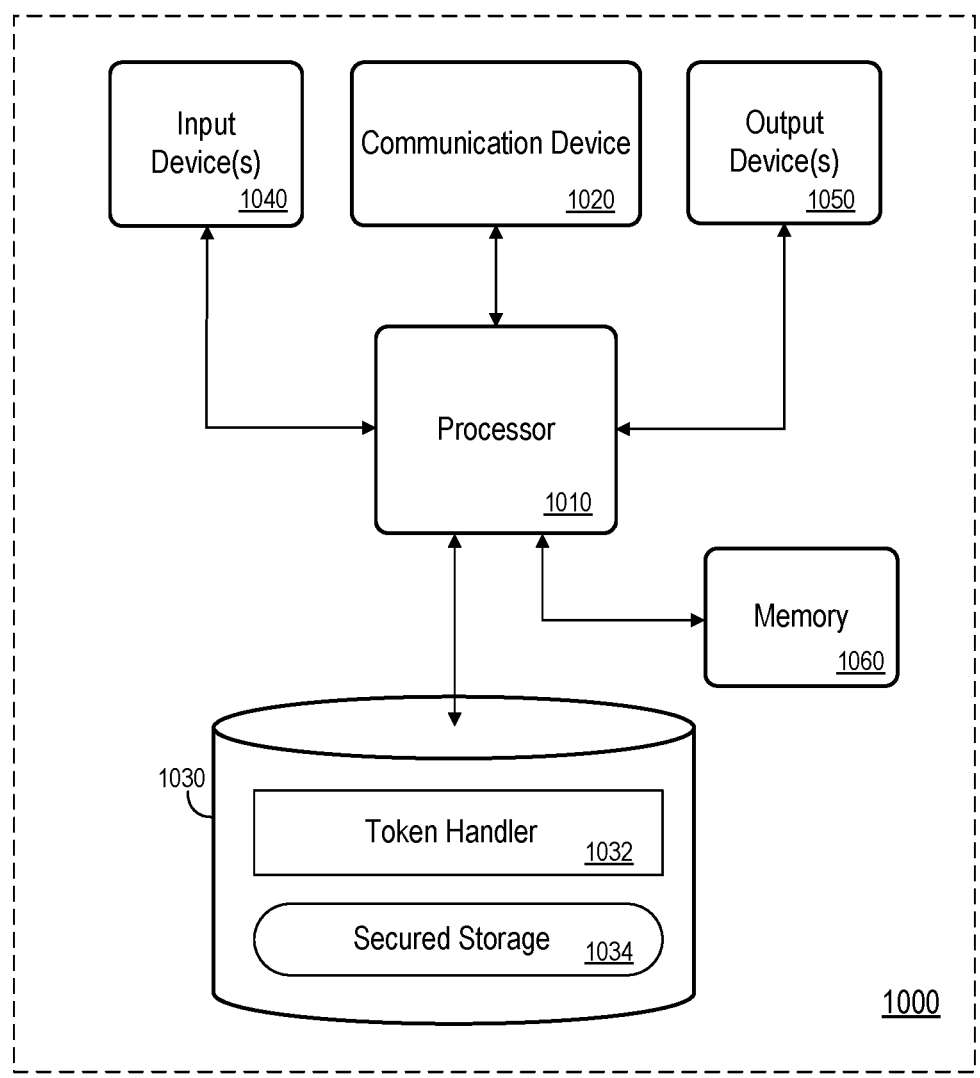
FIG. 10 is a block diagram of a computing device according to some embodiments.

FIG. 10 is a block diagram of apparatus 1000 according to some embodiments. Apparatus 1000 may comprise a general-purpose computing apparatus and may execute program code to perform any of the functions described herein. Apparatus 1000 may comprise an implementation of one or more elements of system 200 or system 900, such as server 220. Apparatus 1000 may include other unshown elements according to some embodiments.

Apparatus 1000 includes processor 1010 operatively coupled to communication device 1020, data storage device 1030, one or more input devices 1040, one or more output devices 1050 and memory 1060. Communication device 1020 may facilitate communication with external devices, such as client 210. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to manipulate graphical user interfaces and to input information into apparatus 1000. Output device(s) 1050 may comprise, for example, a display (e.g., a display screen) a speaker, and/or a printer.

Data storage device 1030 may comprise any device, including combinations of magnetic storage devices (e.g., magnetic tape, hard disk drives and flash memory), optical storage devices, Read Only Memory (ROM) devices, etc., while memory 1060 may comprise Random Access Memory (RAM).

Token handler 1032 of data storage device 1030 may comprise program code executable by processor 1010 to provide any of the functions described herein with respect to token handler 222. Secured storage 1034 may comprise service and token-related data as described with respect to table 228. Data storage device 1030 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in some embodiments may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations.

What is claimed is:

1. A system comprising:
  a memory storing processor-executable program code; and
  a processor to execute the processor-executable program code in order to cause the computing system to:
    receive, at a server and in a first browser session, a request from a client application for a token to access a first software service provided by the server based on an application executing on the server;

determine a token is stored in a server memory of the server and is associated with the first software service and the client application;

determine, by the server, whether a validity period for the token is within a predetermined period of expiration of the token;

in the instance it is determined that the validity period of the token is within a predetermined period of expiration of the token:

transmit, by the server, a request for a new token to access the first software service from a token provider associated with the first software service;

receive the new token to access the first software service from the token provider; and provide the new token to the client application in the first browser session, the client application to call the first software service provided by the server using the new token; and in parallel with the receiving of the request from the client application:

receive, at the server and in a second browser session, a request from a second client application for a token to access the first software service;

determine a second token stored in the server memory and associated with the first software service and the second client application;

determine, at the server, whether a second validity period of the second token is within a second predetermined period of expiration; and in an instance it is determined that the second validity period of the second token is within a second predetermined period of expiration:

transmit a second request for a second new token to access the first software service from the token provider associated with the first software service;

receive the second new token from the token provider; and provide the second new token to the second client application in the second browser session.

2. A system according to claim 1, wherein transmission of the request for the new token comprises:

determination of a secret key stored in the server memory and associated with the client application and the first software service; and transmission of the secret key to the token provider.

3. A system according to claim 1, wherein transmission of the request for the new token comprises:

determination of a secret key stored in the server memory and associated with the client application and the first software service; and transmission of the secret key to the token provider, and wherein transmission of the second request for the second new token comprises:

determination of a second secret key stored in the server memory and associated with the second client application and the first software service; and transmission of the second secret key to the token provider.

4. A system according to claim 1, the processor to further execute the processor-executable program code in order to cause the computing system to:

receive, at the server and in the first browser session, a request from the client application for a token to access a second software service;

determine a second token stored in the server memory and associated with the second software service and the client application;

determine, at the server, whether a second validity period of the second token is within a second predetermined period of expiration; and in an instance it is determined that the second validity period of the second token is within a second predetermined period of expiration:

transmit a second request for a second new token to access the second software service from a second token provider associated with the second software service;

receive the second new token from the second token provider; and provide the second new token to the client application in the first browser session.

5. A system according to claim 4, wherein transmission of the request for the new token comprises:

determination of a secret key stored in the server memory and associated with the client application and the first software service; and transmission of the secret key to the token provider, and wherein transmission of the second request for the second new token comprises:

determination of a second secret key stored in the server memory and associated with the client application and the second software service; and transmission of the second secret key to the second token provider.

6. A computer-implemented method, the method comprising:

receiving, at a server and in a first browser session, a request from a client application for a token to access a first software service provided by the server based on an application executing on the server;

determining, by the server, a token is stored in a server memory of the server and is associated with the first service and the client application;

determining, by the server, whether a validity period of the token is within a predetermined period of expiration of the token;

whether it is determined that the validity period of the token is within a predetermined period of expiration of the token:

transmitting a request for a new token to access the first software service from a token provider associated with the first service;

receiving the new token to access the first software service from the token provider; and providing the new token to the client application in the first browser session, the client application to call the first software service provided by the server using the new token; and in parallel with the receiving of the request from the client application:

receiving, at the server and in a second browser session, a request from a second client application for a token to access the first software service;

determining a second token stored in the server memory and associated with the first software service and the second client application;

determining, at the server, whether a second validity period of the second token is within a second predetermined period of expiration; and in an instance it is determined that the second validity period of the second token is within a second predetermined period of expiration:
transmitting a second request for a second new token to access the first software service from the token provider associated with the first software service;
receiving the second new token from the token provider; and
providing the second new token to the second client application in the second browser session.

7. A method according to claim 6, wherein transmitting the request for the new token comprises:
determining a secret key stored in the server memory and associated with the client application and the first software service; and
transmitting the secret key to the token provider.

8. A method according to claim 6, wherein transmitting the request for the new token comprises:
determining a secret key stored in the server memory and associated with the client application and the first software service; and
transmitting the secret key to the token provider, and
wherein transmitting the second request for the second new token comprises:
determining a second secret key stored in the server memory and associated with the second client application and the first software service; and
transmitting the second secret key to the token provider.

9. A method according to claim 6, further comprising:
receiving, at the server and in the first browser session, a request from the client application for a token to access a second software service;
determining a second token stored in the server memory and associated with the second software service and the client application;
determining, at the server, if a second validity period of the second token is within a second predetermined period of expiration; and
if it is determined that the second validity period of the second token is within a second predetermined period of expiration:
transmitting a second request for a second new token to access the second software service from a second token provider associated with the second software service;
receiving the second new token from the second token provider; and
providing the second new token to the client application in the first browser session.

10. A method according to claim 9, wherein transmitting the request for the new token comprises:
determining a secret key stored in the server memory and associated with the client application and the first software service; and
transmitting the secret key to the token provider, and
wherein transmitting the second request for the second new token comprises:
determining a second secret key stored in the server memory and associated with the client application and the second software service; and
transmitting the second secret key to the second token provider.

11. A non-transitory computer-readable medium storing program code, the program code executable by a processor of a computing system to cause the computing system to:
receive, at a server and in a first browser session, a request from a client application for a token to access a first software service provided by the server based on an application executing on the server;
determine a token is stored in a server memory of the server and is associated with the first software service and the client application;
determine, by the server, whether a validity period for the token is within a predetermined period of expiration of the token;
in the instance it is determined that the validity period of the token is within a predetermined period of expiration of the token:
transmit a request for a new token to access the first software service from a token provider associated with the first software service;
receive the new token to access the first software service from the token provider; and
provide the new token to the client application in the first browser session, the client application to call the first software service provided by the server using the new token; and
in parallel with the receiving of the request from the client application:
receive, at the server and in a second browser session, a request from a second client application for a token to access the first software service;
determine a second token stored in the server memory and associated with the first software service and the second client application;
determine, at the server, whether a second validity period of the second token is within a second predetermined period of expiration: and
in an instance it is determined that the second validity period of the second token is within a second predetermined period of expiration:
transmit a second request for a second new token to access the first software service from the token provider associated with the first software service:
receive the second new token from the token provider: and
provide the second new token to the second client application in the second browser session.

12. A non-transitory computer-readable medium according to claim 11, wherein transmission of the request for the new token comprises:
determination of a secret key stored in the server memory and associated with the client application and the first software service; and
transmission of the secret key to the token provider.

13. A non-transitory computer-readable medium according to claim 11, wherein transmission of the request for the new token comprises:
determination of a secret key stored in the server memory and associated with the client application and the first software service; and
transmission of the secret key to the token provider, and
wherein transmission of the second request for the second new token comprises:
determination of a second secret key stored in the server memory and associated with the second client application and the first software service; and
transmission of the second secret key to the token provider.

14. A non-transitory computer-readable medium according to claim 11, the program code further executable by the computing system to:

receive, at the server and in the first browser session, a request from the client application for a token to access a second software service;

determine a second token stored in the server memory and associated with the second software service and the second client application;

determine, at the server, if a second validity period of the second token is within a second predetermined period of expiration; and if it is determined that the second validity period of the second token is within a second predetermined period of expiration:

transmit a second request for a second new token to access the second software service from a second token provider associated with the second software service;

receive the second new token from the second token provider; and provide the second new token to the client application in the first browser session.

15. A non-transitory computer-readable medium according to claim 14, wherein transmission of the request for the new token comprises:

determination of a secret key stored in the server memory and associated with the client application and the first software service; and transmission of the secret key to the token provider, and wherein transmission of the second request for the second new token comprises:

determination of a second secret key stored in the server memory and associated with the client application and the second software service; and transmission of the second secret key to the second token provider.

* * * * *